(12) United States Patent
Hinrichs et al.

(10) Patent No.: US 8,346,941 B2
(45) Date of Patent: Jan. 1, 2013

(54) METHOD FOR TRANSMITTING DATA FROM AND TO A CONTROL DEVICE

(75) Inventors: Andreas Hinrichs, Rieste (DE); Peter Vogel, Hildesheim (DE); Florian Wildschuette, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 12/300,289

(22) PCT Filed: Mar. 23, 2007

(86) PCT No.: PCT/EP2007/052838
§ 371 (c)(1),
(2), (4) Date: Nov. 10, 2008

(87) PCT Pub. No.: WO2007/131825
PCT Pub. Date: Nov. 22, 2007

(65) Prior Publication Data
US 2009/0182882 A1 Jul. 16, 2009

(30) Foreign Application Priority Data

May 11, 2006 (DE) .......................... 10 2006 021 947

(51) Int. Cl.
*G06F 15/16* (2006.01)

(52) U.S. Cl. .......................... 709/227; 709/217; 709/228

(58) Field of Classification Search .................. 709/203, 709/217–219, 227–229; 455/412.1–412.2, 455/413, 425, 438, 456.2, 466
See application file for complete search history.

(56) References Cited

U.S. PATENT DOCUMENTS

| | | | | |
|---|---|---|---|---|
| 6,389,120 | B1 * | 5/2002 | Garland et al. | 379/93.01 |
| 6,965,580 | B1 * | 11/2005 | Takagi et al. | 370/312 |
| 7,099,288 | B1 * | 8/2006 | Parker et al. | 370/259 |
| 7,720,788 | B2 * | 5/2010 | Carpenter | 706/62 |
| 2003/0096615 | A1 * | 5/2003 | Beckers et al. | 455/450 |
| 2004/0122907 | A1 * | 6/2004 | Chou et al. | 709/207 |
| 2004/0254993 | A1 * | 12/2004 | Mamas | 709/206 |
| 2007/0022200 | A1 * | 1/2007 | Benkert et al. | 709/227 |
| 2007/0258701 | A1 * | 11/2007 | Lee et al. | 386/96 |
| 2008/0068995 | A1 * | 3/2008 | Skog | 370/230.1 |

FOREIGN PATENT DOCUMENTS

| | | |
|---|---|---|
| CN | 1561580 | 1/2005 |
| WO | WO 03/032500 | 4/2003 |
| WO | 2005/114878 | 12/2005 |

* cited by examiner

*Primary Examiner* — Mohamed Ibrahim
(74) *Attorney, Agent, or Firm* — Kenyon & Kenyon LLP

(57) ABSTRACT

A method is described for signaling a connection request between data processing devices, in which a connection call (12) is transmitted by broadcast (10), the connection call calling at least one data terminal (2) to set up, via a radio network, a connection (20) suitable for transmitting the data.

22 Claims, 2 Drawing Sheets

METHOD FOR TRANSMITTING DATA FROM AND TO A CONTROL DEVICE

FIELD OF THE INVENTION

The present invention relates to a method for signaling a connection request, a system for signaling a connection request, a data terminal, a computer program stored on a computer readable medium and a computer program product.

BACKGROUND INFORMATION

On the Internet, data is usually exchanged in client/server mode. In doing this, a client, which is usually a program on a data terminal, for example an arithmetic unit of a user, first sets up a connection to a server and then requests data from this server. This may mean that a browser, as the client, requests HTML pages from a server. A procedure of this type, in which data is sent only on request and is therefore "pulled" by the client, is referred to as "pulling."

The server would theoretically be able to send its information to the client without being requested to do so, i.e., without first receiving a query, which is referred to as "pushing." However, to date such applications on the Internet have had limited usage, e.g., for so-called instant messaging.

The Open Mobile Alliance organization (OMA, previously WAP Forum) has developed a push protocol family which may be used to send data from an Internet server to a mobile data terminal (MT) in data push mode, thereby enabling the data to be pushed by the Internet server.

According to this method, however, an Internet server, as the push initiator (PI), which initiates a push and therefore dispatches the data, does not send the data directly to the mobile terminal. Via a push proxy gateway (PPG), i.e., a protocol converter for transmitting data, or a gateway, the data is optimally adjusted to an air interface suitable for wireless transmission. The data may be sent and thereby transmitted from the PPG to the mobile data terminal as either an HTTP or a WAP (WSP) message. This procedure is specified in the so-called push-over-the-air protocol (Push OTA) for wireless pushing and thus dispatch of data.

In an optional refinement, using a so-called session initiation push protocol (SIP), which is suitable for setting up multimedia sessions and was specified by the IETF (Internet Engineering Task Force)—an organization which sets standards for the Internet—data of this type may be packaged and sent to the mobile terminal in the form of OTA SIP. This may increase interoperability between at least two different users and thus data-exchanging platforms.

An exemplary flow chart of a data transmission process of this type is illustrated schematically in FIG. 3. An Internet server 50, as the push initiator, first sends a message 52 containing the control data for a specific mobile data terminal 54, for example a mobile phone, via a push access protocol (PAP) to a gateway 56 and signals the fact that this message 52 should be sent to specific data terminal 54. To do this, gateway 56 must contact data terminal 54 via OTA WSP or OTA HTTP, using a push over-the-air protocol 58.

However, mobile communications network operators usually do not allow just any external server to set up a connection to a mobile subscriber from the Internet without being requested to do so. This means that the desired WSP session or a TCP/IP connection must be set up by the mobile data terminal.

To enable a session/connection to be initiated externally in spite of this, the OMA push protocol defines the so-called session initiation request (SIR) and the session initiation application (SIA). SIA is an application that runs in the mobile terminal and enables the PPG to ask the data terminal to open a push session or an active TCP/IP connection for the purpose of transmitting data to the data terminal.

A possible procedure for this purpose is illustrated schematically in FIG. 4. Once an Internet server 60 has initiated a push via a push-over-the-air protocol 62 and sent a corresponding message to a gateway 64, a connection call 66 (SIR) is sent from gateway 64 to data terminal 68 so that the latter sets up a push session or active TCP/IP connection to Internet server 60 via gateway 64, using push-over-the-air protocol 62. A special, relatively simple code is used for the content of the SIR or SIA (for example of the type "application/vnd-.wap.sia"), so that the message has a small data scope. A connection call 66 or SIR, for example, may therefore also be transmitted by SMS (text messaging).

SUMMARY OF THE INVENTION

The present invention relates to a method for signaling a connection request between data processing devices, in which a connection call is transmitted by broadcast, by which at least one data terminal is called to set up, via a radio network, a connection suitable for transmitting data. The connection suitable for transmitting the data may be set up via a radio network designed as a mobile communications network.

The connection call transmitted by broadcast and thus via a unidirectional radio network signals to the data processing device, which is designed as the at least one data terminal and usually has Internet access, that the data is available. Once the connection suitable for transmitting the data has been set up to a gateway or a server as the data processing device, the server providing the data and/or making it available, this data may be requested and loaded. The data is transmitted via a bidirectional radio network, which is different from the unidirectional broadcasting network used to transmit the connection call. In particular, a mobile communications network is suitable as the bidirectional radio network.

The present invention also relates to a system for signaling a connection request between data processing devices, the system having at least one transmitter as the air interface. The at least one transmitter is designed to transmit a connection call by broadcast and to call, via the connection call, at least one data terminal to open or set up, via a radio network, a connection suitable for transmitting the data.

This system includes at least one server which is designed to provide the data, as well as at least one gateway. The gateway is designed to ensure a wireless data exchange with the data terminal.

This means that the gateway is used to prepare information on the connection call or the connection call itself, if made available by the server as the push initiator, for wireless transmission by broadcast and thus provide it for transmission. The server therefore initiates the connection call and thus the data transmission. The gateway may further be used as an air interface for the server and thus for wireless communication between the server and the at least one data terminal. Once the connection call signals to the data terminal that data provided for the data terminal is present, and if interest in this data exists, the data terminal sets up the connection suitable for transmitting the data to the server via the radio network which is designed, in particular, as a mobile communications network, and via the gateway. A data transmission to the data terminal initiated by the server takes place over the same connection.

The data terminal according to the present invention is suited to receive a connection call, transmitted by broadcast or by a broadcasting system, by which data provided for the data terminal are announced, and, called by this connection call, to open, via a radio network, a connection suited to receive the data.

The system and the data terminal are designed for carrying out the method according to the present invention. The data terminal is provided for wireless communication via multiple frequency bands, enabling the data terminal to at least receive and/or transmit data at at least one radio frequency and at at least one mobile communications frequency.

The computer program according to the present invention having a program code arrangement is designed to perform all steps of a method according to the present invention when the computer program is run on a computer or a corresponding arithmetic unit, in particular in a system according to the present invention or a data terminal according to the present invention.

The present invention also relates to a computer program product having a program code arrangement which is stored on a machine-readable data carrier for the purpose of carrying out all steps of a method according to the present invention when the computer program is run on a computer or a corresponding arithmetic unit, in particular in a system according to the present invention or a data terminal according to the present invention.

Broadcasting involves the transmission of, for example, audiovisual data and/or information which everyone is able to receive. This transmission takes place via electromagnetic waves. Broadcasting therefore enables public information to be transmitted between one subscriber as the sender and multiple subscribers as recipients. This is also referred to as point-to-multipoint transmission. Communication is therefore one-sided, that is, initiated by the sender and directed toward the recipients. The data and/or information provided by the sender in this case may also be broadcast by multiple transmitters.

In the case of individual communication differing from broadcasting as occurs, for example, in mobile telephony, mutual communication is provided between what are usually two equal subscribers, each of which is both the sender and the recipient.

By broadcasting the connection call, in particular a so-called push session initiation request (SIR) via a digital broadcasting system, it is possible to provide an additional mechanism for transmitting an OMA (Open Mobile Alliance) push session request. Transmitting the connection call by broadcast makes it possible to also signal to a large number of relevant subscribers the fact that a connection is to be set up to a specific server. Contact of this type is non-binding and minimizes both costs and transmission complexity.

According to the exemplary embodiments and/or exemplary methods of the present invention, the connection call is ordinarily used to communicate events which are destined for a user of the data terminal. Likewise, necessary changes to a device or a system may be carried out. A device of this type may be the data terminal and/or a device interacting with the data terminal, for example via data exchange. The connection call may include data for displaying important information, calendar events, schedule changes, availability of new applications and/or services, paging, IT administration, etc. The connection call may be used to communicate the availability of data of this type.

For applications of the exemplary embodiments and/or exemplary methods of the present invention in a vehicle which has at least one data terminal designed to carry out the present invention and/or which is connectable to a data terminal of this type, a similar mobility scenario exists so that, in possible applications, data may be provided to the vehicle or to at least one device of the vehicle.

However, other options also exist in the vehicle, in particular to display the availability of software updates or specific manufacturer information. Since it is not usually possible to set up a push connection from a server via a mobile network, the connection call may also be transmitted by broadcast in the form of an initiating text message.

In carrying out the exemplary embodiments and/or exemplary methods of the present invention, an initiating message, and thus the connection call, may alternatively be dispatched to the data terminal or a mobile terminal via SIR or a corresponding message via digital broadcast (DAB, DVB).

According to the present invention, it is proposed that push session requests, e.g., SIR messages, be transmitted via broadcasting systems, that is, via broadcasting transmitters or at least one broadcasting network, using suitable transmitters as air interfaces to prompt, via the connection call, the data terminals provided as receivers to set up or initiate a session with the server designed in particular as an Internet server or the gateway.

It is therefore conceivable for a manufacturer in the future to lease digital broadcasting bandwidths for the purpose of broadcasting information to a large group of users. In this manner, an information service may be made continuously available to users. Within this information service, different data formats, which are also used in other multimedia systems, for example online services or the Internet, may be transmitted by digital broadcast. For example, HTTP- or HTML-encoded documents may also be broadcast via DAB or DVD with relatively little effort.

The implementation of the exemplary embodiments and/or exemplary methods of the present invention may be based on the fundamental structure of the push architecture proposed by OMA and described briefly above. However, the basic ideas are also transferable to other systems and protocols. The connection call in the form of a session request should therefore be understood as a generalization of an OMA SIR message, that is, a message broadcast by a broadcaster for the purpose of prompting the typically mobile data terminal to connect to a specific server.

A push gateway in the form of a first air interface is understood to be a generalization of an OMA PPG and is suitable as a protocol converter for transmitting data. In this case, a protocol converter as the PPG (push proxy gateway) is provided in particular for wireless data transmission. As a server, the gateway may contact a broadcaster and transmit contents of the connection call to the, in particular, terrestrial transmitter as a second air interface. The gateway is also suitable for transmitting the data actually to be provided between the server and the data terminal.

The following three options are conceivable for embedding the connection call (session request) into the data stream of the preferably digital broadcast.

Thus, a broadcast-specific network protocol may be used to convert the connection call. The network protocol/gateway (PPG) for sending the connection call is advantageously integrated into the transmission operation of the broadcast. The broadcaster may therefore maintain his own gateway or a network protocol which is publicly accessible and is reachable from the Internet and converts an SIR request to a format adapted for broadcast transmission and thus provides the connection call. Consequently, a direct connection between the Internet server as the push initiator and a broadcasting server is possible.

A connection between a protocol converter for PPG data transmission and the broadcasting system via a special protocol is possible as an alternative. If the broadcaster does not maintain a true, directly accessible push gateway, communication must take place between the gateway accessible by the server and the broadcaster for the purpose of requesting the transmission of the connection call by broadcast. A communication protocol is used to signal to the broadcaster which terminals and applications are affected and which servers must be contacted by the terminal later on.

A further option for transmitting the connection call (SIR) by broadcast is the fact that the push initiator sends information directly to a broadcaster, for example via a proprietary protocol which does not yet exist. A PPG or gateway is not used in this case.

Parameters which apply to all three options described above may be defined for this purpose and transmitted to a broadcaster as additional data. Thus, it is possible to determine how long the connection call is valid. It is also possible to transmit how frequently the connection call is to be transmitted in broadcasting mode. Moreover, a method for signaling cancellation, modification and/or exclusion of recipients, and therefore also of data terminals, may also be carried out. The broadcaster may encrypt the connection call so that only selected data terminals, and thus subscribers, are notified thereof.

The connection call may, in principle, be transmitted in various formats in broadcasting mode. If the connection call is formatted as an OMA session request, it is possible to signal which data terminals and applications are affected and which servers are to be contacted later on by which data terminals via which protocols.

The push information may be incorporated accordingly into the broadcast data stream, for which purpose a broadcast header name, such as "SIR", "SIA", "application/vnd.wap-.sia", "SR" or another name, may be inserted within the broadcast data stream for the purpose of identifying push data. In the case of DAB, this may be accomplished by introducing an additional data format, for example within the framework of the so-called MOT protocol.

The broadcast data stream may be evaluated in a vehicle which has at least one data terminal. Connection calls may be temporarily stored for later processing. When matching connection calls with a user profile of the vehicle, it is possible to determine which external servers are to be contacted and which applications are relevant. For example, a table containing a list of server addresses, applications and/or manufacturers may be provided for this purpose in the vehicle. Thus, when a connection call is received, the destination address contained therein may be immediately evaluated to determine whether the address is known and secure, thereby preventing a connection from being set up to unknown addresses. The user may also be asked whether he wants the connection to be set up.

DETAILED DESCRIPTION

Figure 1:
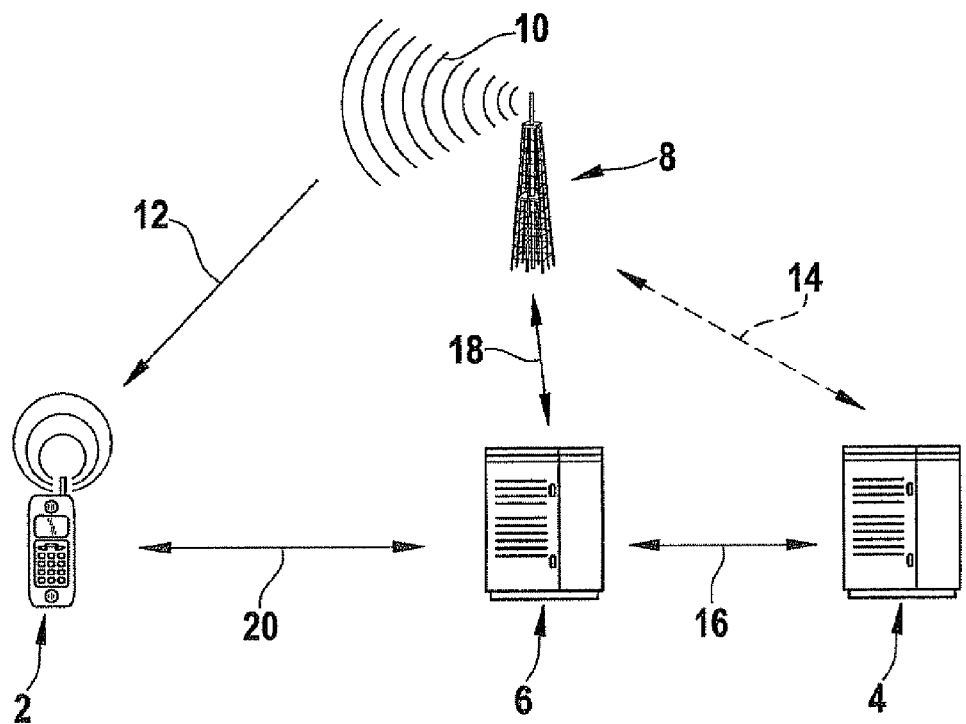
FIG. 1 shows a schematic representation of an embodiment of both a system for providing data and a data terminal.

FIG. 1 shows a specific embodiment of a system for providing data for a data terminal 2, which is designed here as a mobile phone. The system includes an Internet server 4, a switching gateway 6 and a transmitter 8 for broadcast 10.

When Internet server 4 has new data ready for data terminal 2, data terminal 2 is notified of the availability of this data by a connection call 12. This connection call 12 is transmitted from transmitter 8 by broadcast 10 and thus a broadcasting network, which in this specific embodiment is used as a unidirectional radio network.

FIG. 1 shows two ways in which connection call 12 to be broadcast unidirectionally by transmitter 8 may be initiated by Internet server 4.

Gateway 6 typically adjusts the data between Internet server 4 and the broadcasting system. Via a data exchange 16, using a push access protocol, information which affects the connection call is transmitted from Internet server 14 to gateway 6 and from gateway 6 to transmitter 8 by communication 18, after being prepared accordingly. Connection call 12 is transmitted from the transmitter by broadcast 10. Gateway 6 is also directly integratable into the operation of broadcast 10.

If transmitter 8 of broadcast 10, which is provided as an air interface, has a suitable network interface, a message of connection call 12 may be initiated by direct transmission 14 from Internet server 4 to transmitter 8.

Once data terminal 2 has received connection call 12 and information indicating the availability of the data is present, a user or a corresponding application of data terminal 2 is able to obtain the data. For this purpose, a bidirectional connection 20, which is suitable for transmitting the data, is set up by data terminal 2 via a mobile communications network to gateway 6, which now serves as an air interface for Internet server 4. In this embodiment, the mobile communications network is used as a bidirectional radio network. The data is transmitted from Internet server 4 by data exchange 16 to gateway 6 and from there to at least one data terminal 2 via connection 20 opened by data terminal 2, using a push-over-the-air protocol. Alternatively, it is also conceivable to set up a connection directly from data terminal 2 to Internet server 4.

Figure 2:
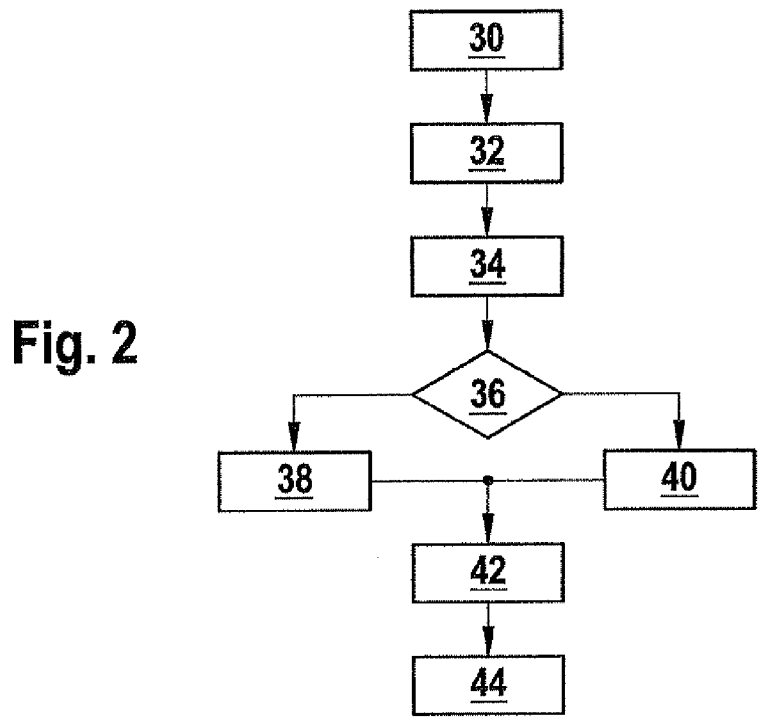
FIG. 2 shows a schematic representation of a diagram of an embodiment of a method for providing data.
Figure 3:
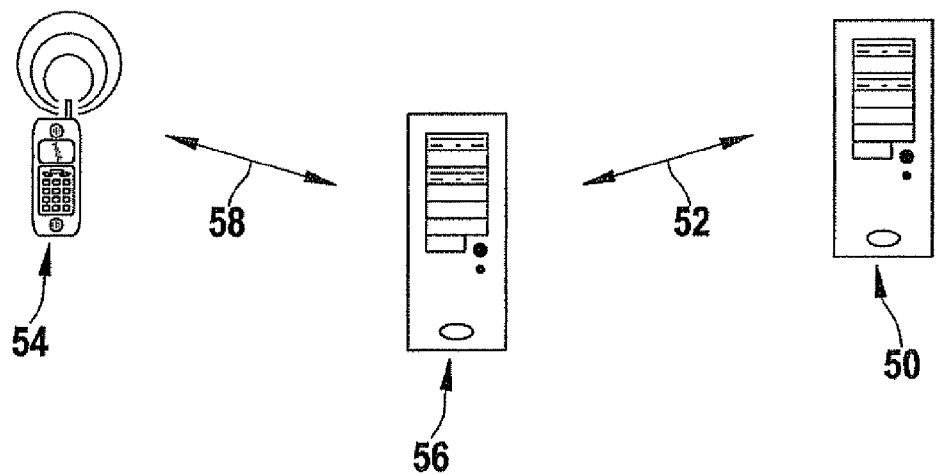
FIG. 3 shows a schematic representation of a system for implementing an OMA push architecture according to the related art.
Figure 4:
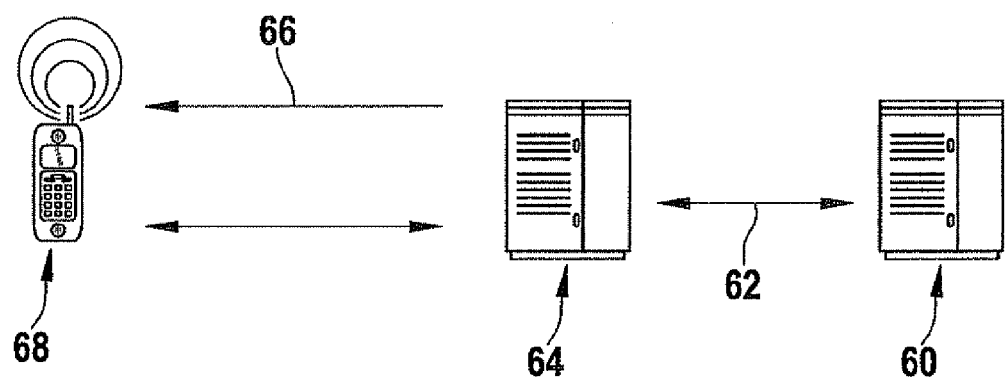
FIG. 4 shows a schematic representation of a system for providing a session initiation request according to the related art.

The diagram in FIG. 2 shows a specific embodiment of a flow chart for the method according to the present invention. In a profiling step 30, at least one data terminal defines a profile containing permissible servers, and thus push initiators, so that servers of this type may offer data to the at least one data terminal. In the event of an optional subsequent login 32, the at least one data terminal logs into a service for providing data of a server which is designed as a push initiator.

In a contacting step 34, data which is suitable for the at least one data terminal is available to the server, and the server notifies the data terminal thereof. In a subsequent decision step 36, a decision is made about the path via which information about the data availability will be transmitted to the at least one data terminal.

According to this embodiment of the present invention, a connection call, which is to notify the at least one data terminal of the availability of the data, is communicated from a transmitter by broadcast. In decision step 36, the question arises as to whether a gateway designed as a PPG is used for this purpose. If the answer is "yes," the information for the connection call is transmitted to the transmitter via the gateway, using an indirect path 38. If the answer is "no," the information for the connection call is transmitted to the transmitter using a direct path 40.

Regardless of the path 38, 40 by which the information for the connection call reaches the transmitter, in the case of transmission 42, the connection call is integrated into a data stream of the broadcast and is thus transmitted wirelessly to the at least one data terminal. Upon receipt 44 of the connection call, the at least one data terminal evaluates the connection call and, if desired, sets up a connection to the server for the purpose of retrieving the data communicated by the server.

What is claimed is:

1. A method for signaling a connection request between data processing devices, the method comprising:
    transmitting a connection call from a server to data terminals via a first unidirectional radio network by broadcast via a broadcast transmitter; and
    calling at least one data terminal to use a second bidirectional mobile network to set up a connection between the server and the at least one data terminal suitable for transmitting the data,
    wherein a unidirectional connection call is routed in a different path than a path of a bidirectional direct connection between the server and the at least one data terminal, wherein the second bidirectional mobile network for transmitting the data is set UP via a radio network which is a mobile communications network, wherein a direct connection is set up from the data terminal to a server, which makes the data available, and
    wherein the broadcasting system is contacted by a push initiator via a public protocol converter which is a push proxy gateway.

2. The method of claim 1, wherein an access authorization for the data is transmitted by the connection call.

3. The method of claim 2, wherein the connection call is transmitted in encrypted form for the at least one data terminal, and wherein the push proxy gateway is integrated into the system operation of the broadcasting system.

4. The method of claim 2, further comprising;
    matching with a profile of a user of the at least one data terminal and also a query;
    wherein additional data are transmitted to an operator of the broadcast.

5. The system of claim 2, wherein a profile of a user of the at least one data terminal and a query are matched, and wherein additional data are transmitted to an operator of the broadcast.

6. The method of claim 1, wherein the second bidirectional mobile network for transmitting the data is set up via a radio network which is a mobile communications network.

7. The method of claim 6, wherein a direct connection is set up from the data terminal to a server, which makes the data available.

8. The method of claim 1, wherein the broadcasting system is contacted by a push initiator via a public protocol converter which is a push proxy gateway.

9. The method of claim 8, wherein the push proxy gateway is integrated into the system operation of the broadcasting system.

10. The method of claim 1, wherein an access authorization for the data is transmitted by the connection call.

11. The method of claim 1, wherein the connection call is transmitted in encrypted form for the at least one data terminal.

12. The method of claim 1, wherein a broadcasting system is contacted directly by a push initiator.

13. The method of claim 1, wherein additional data are transmitted to an operator of the broadcast.

14. The method of claim 1, further comprising;
    matching with a profile of a user of the at least one data terminal and also a query.

15. The method of claim 1, wherein the connection between the server and the at least one data terminal is a direct connection.

16. A system for signaling a connection request between data processing devices, comprising:
    at least one transmitter arrangement to transmit, via a first unidirectional radio network by a broadcast via a broadcast transmitter, a connection call from a server to at least one data terminal to set up, via a second bidirectional mobile network, a connection between the server and the at least one data terminal suitable for transmitting the data,
    wherein a unidirectional connection call is routed in a different path than a path of a bidirectional direct connection between the server and the at least one data terminal, wherein the second bidirectional mobile network for transmitting the data is set UP via a radio network which is a mobile communications network, wherein a direct connection is set up from the data terminal to a server, which makes the data available, and
    wherein the broadcasting system is contacted by a push initiator via a public protocol converter which is a push proxy gateway.

17. The system of claim 16, further comprising:
    at least one server to provide the data.

18. The system of claim 17, further comprising:
    at least one gateway to ensure a wireless exchange of data with the server.

19. The system of claim 16, wherein the second bidirectional mobile network for transmitting the data is set up via a radio network which is a mobile communications network, wherein a direct connection is set up from the data terminal to a server, which makes the data available, and wherein an access authorization for the data is transmitted by the connection call.

20. The system of claim 19, wherein the connection call is transmitted in encrypted form for the at least one data terminal, wherein the broadcasting system is contacted by a push initiator via a public protocol converter which is a push proxy gateway, and wherein the push proxy gateway is integrated into the system operation of the broadcasting system.

21. A data terminal, comprising:
    a receiver arrangement to receive a connection call from a server to a data terminal, transmitted via a first unidirectional radio network by a broadcast via a broadcast transmitter, by which data provided for the data terminal are announced, and, called by this connection call, to open, via a second bidirectional mobile network, a connection between the server and the at least one data terminal suited to receive the data, wherein a unidirectional connection call is routed in a different path than a path of a bidirectional direct connection between the server and the at least one data terminal,
    wherein the second bidirectional mobile network for transmitting the data is set UP via a radio network which is a mobile communications network, wherein a direct connection is set up from the data terminal to a server, which makes the data available, and
    wherein the broadcasting system is contacted by a push initiator via a public protocol converter which is a push proxy gateway.

22. A non-transitory computer readable medium having a computer program executable by a processor, comprising:
a program code arrangement for signaling a connection request between data processing devices, by performing the following:
transmitting a connection call from a server to data terminals via a first unidirectional radio network by broadcast via a broadcast transmitter; and
calling at least one data terminal to use a second bidirectional mobile network to set up a connection between the server and the at least one data terminal suitable for transmitting the data, wherein a unidirectional connection call is routed in a different path than a path of a bidirectional direct connection between the server and the at least one data terminal, wherein the second bidirectional mobile network for transmitting the data is set up via a radio network which is a mobile communications network, wherein a direct connection is set up from the data terminal to a server, which makes the data available, and wherein the broadcasting system is contacted by a push initiator via a public protocol converter which is a push proxy gateway.

* * * * *